No. 879,344.
PATENTED FEB. 18, 1908.
M. I. WILSON.
HAY PRESS.
APPLICATION FILED MAY 24, 1906.
3 SHEETS—SHEET 3.
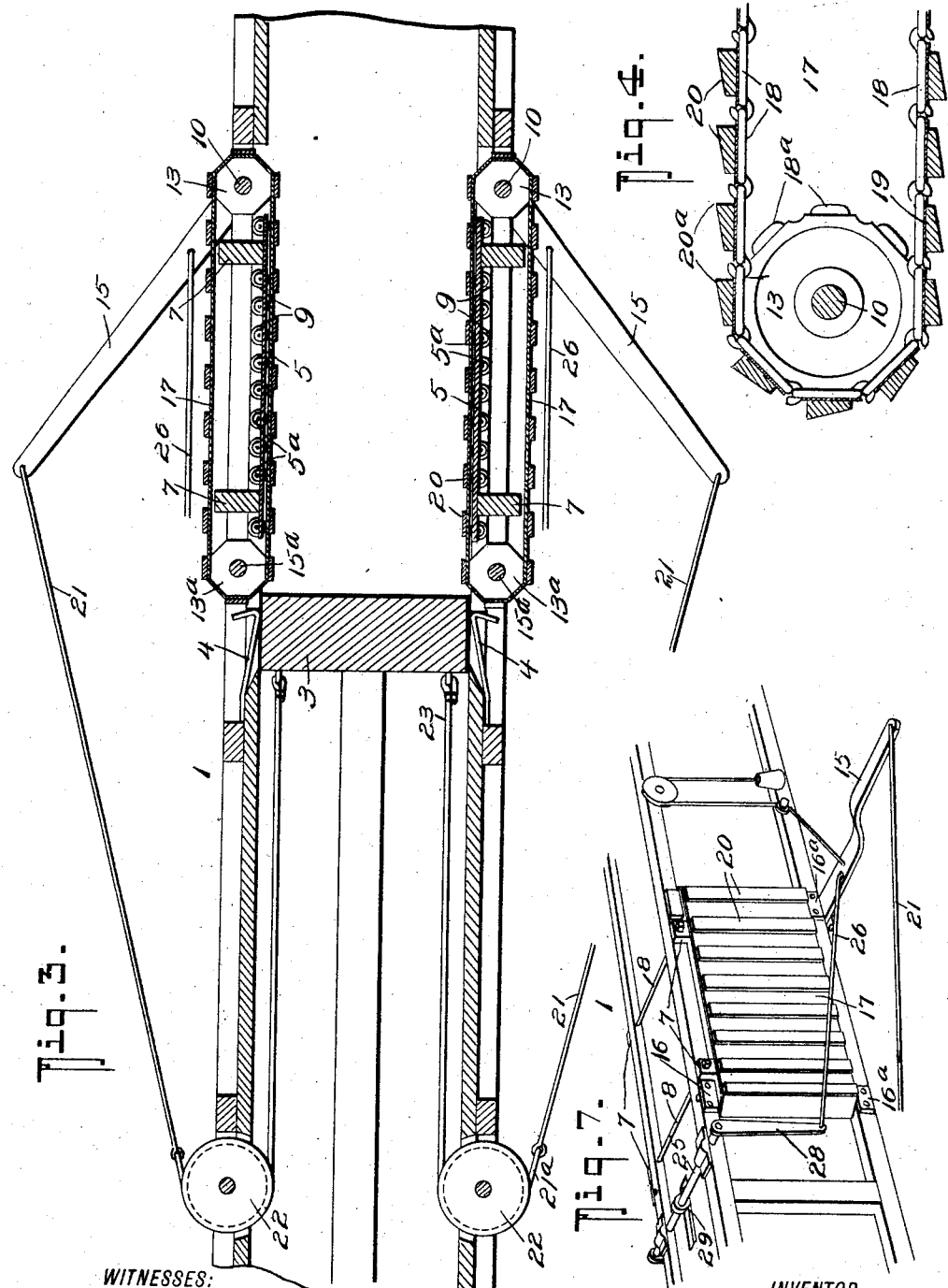
WITNESSES:
INVENTOR
Myron I. Wilson.
BY
ATTORNEYS

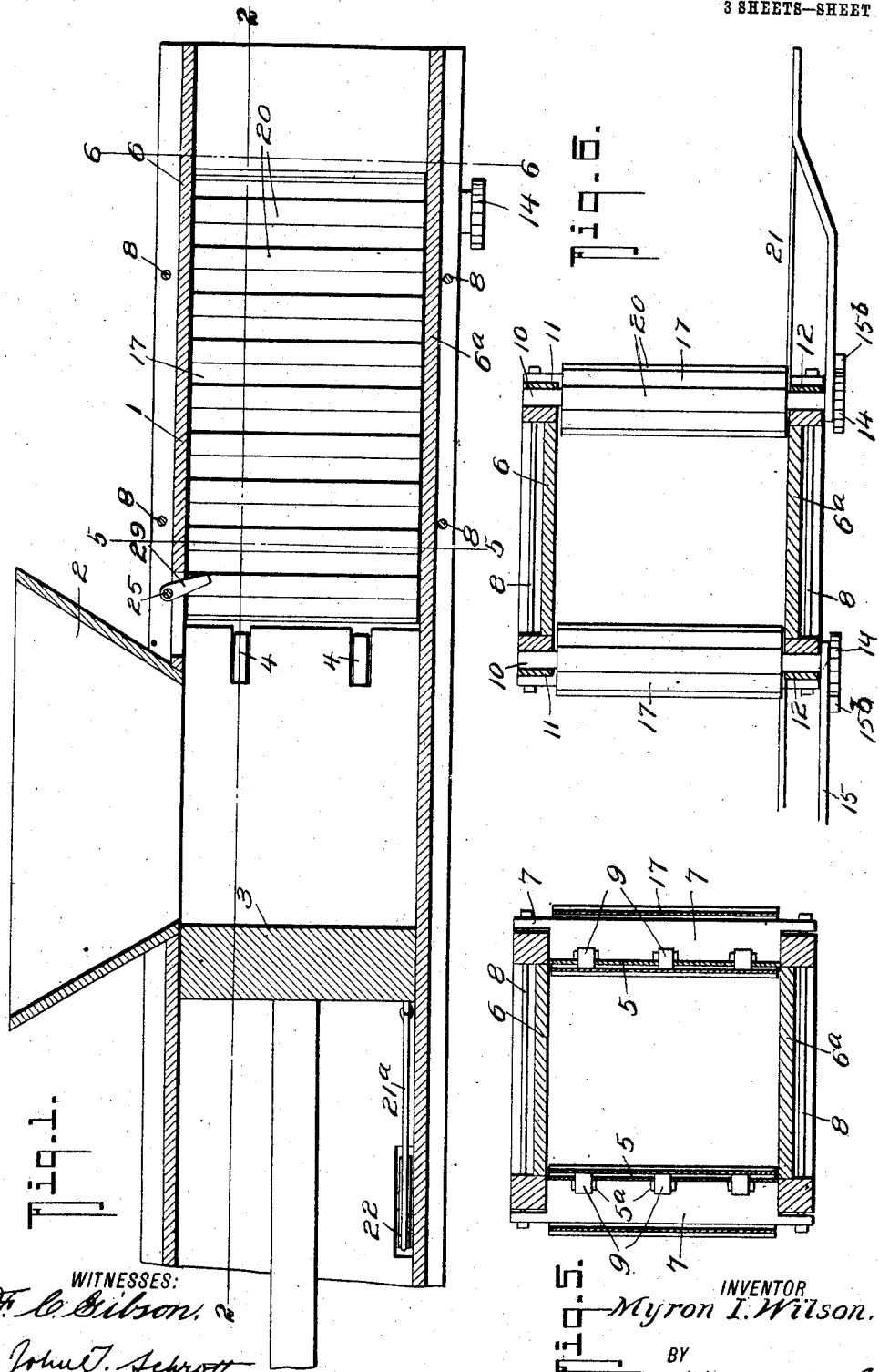

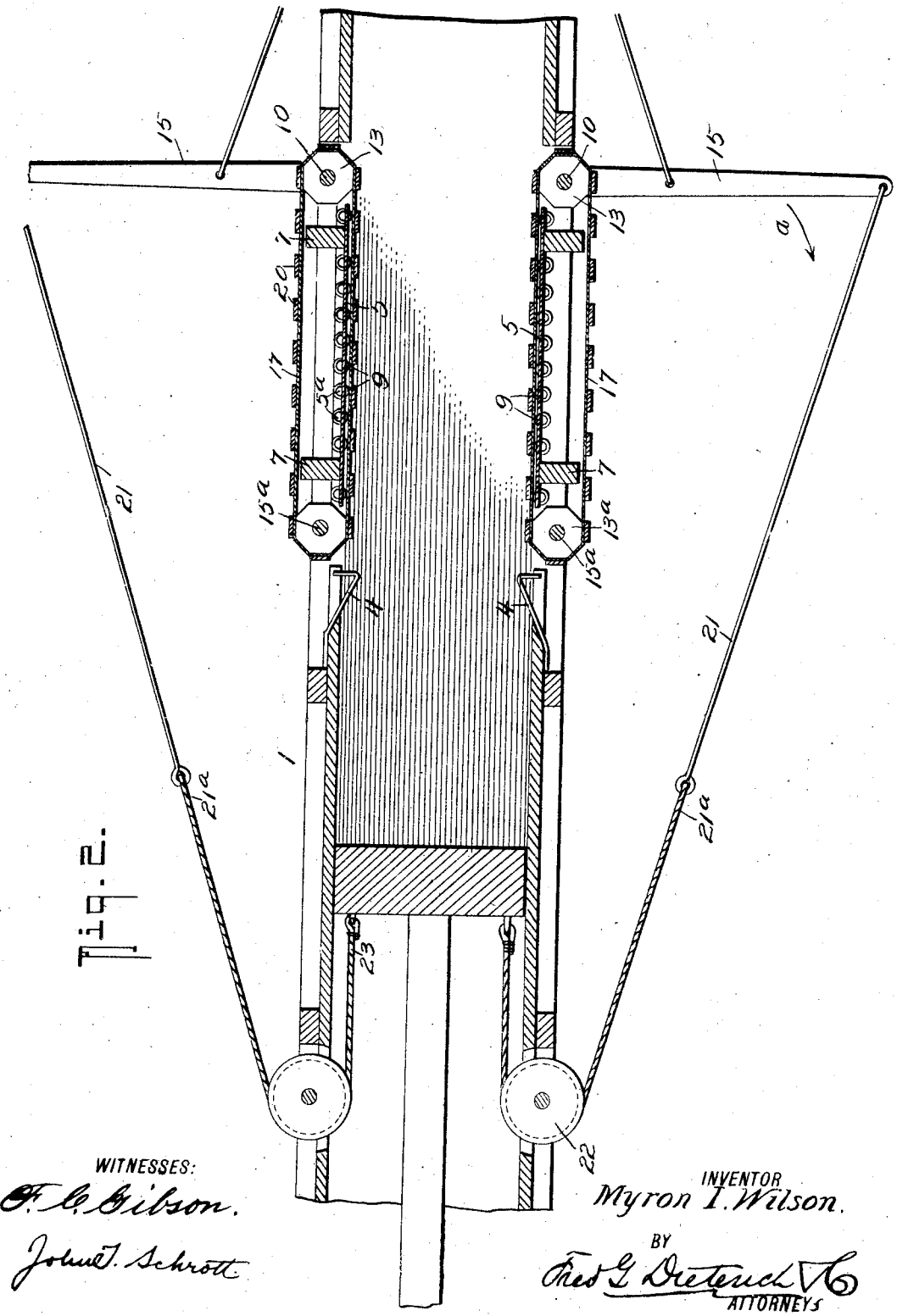

UNITED STATES PATENT OFFICE.

MYRON IRVING WILSON, OF OHLMAN, ILLINOIS.

HAY-PRESS.

No. 879,344.      Specification of Letters Patent.      Patented Feb. 18, 1908.

Application filed May 24, 1906. Serial No. 318,566.

*To all whom it may concern:*

Be it known that I, MYRON I. WILSON, residing at Ohlman, in the county of Montgomery and State of Illinois, have invented certain new and useful Improvements in Hay-Presses, of which the following is a specification.

My invention seeks to provide a simple and economical means in the nature of an attachment for hay presses for taking up the hay from the beater or plunger of a hay press, actuated by the movement of the beater or plunger whereby to intermittently move the bale to eject the same, in such manner that the jerk or hard pull on baling means, is avoided and for making ready for the beat or plunger coming so that the plunger has nothing to do but form the beat.

My invention comprehends a feed mechanism adapted to frictionally engage the opposite sides of the bale under strong tension, and a means controlled by the beater or plunger actuating mechanism for intermittently driving said feed mechanism and for controlling the grip on the bale whereby to cause the press to do the work much easier and for holding the hay from rebounding.

In its more complete nature, my invention embodies a bale receiving chamber having a pair of oppositely disposed steel sides, means for holding them under tension from expanding, endless slatted conveyers, one for each side, that run over the inner faces of the sides for engaging the bale and means for intermittently moving the said conveyers forward in unison, controlled from and whose degree of movement is governed by the stroke of the beater or plunger.

In its more subordinate features, my invention consists in certain details of construction and peculiar combination of parts, all of which will be hereinafter described, pointed out in the appended claims and illustrated in the accompanying drawings, in which:—

Figure 1, is a perspective view of my invention with so much of the ordinary type of baling press necessary to illustrate the practical application of the same. Fig. 2, is a horizontal section of the same, taken practically on the line 2—2 on Fig. 1, the beater or plunger being at its backmost thrust, the ratchet levers for actuating the endless conveyer shafts being in position to impart a rotary motion to the said shafts. Fig. 3, is a similar view showing the beater at its foremost position, the levers swung forward and the bale moved correspondingly. Fig. 4, is an enlarged horizontal section of one of the roller carrying sides, the conveyer movable thereover, and the dog or hold back devices hereinafter described. Fig. 5, is a transverse section of the bale receiving end of the press that has the conveyers thereon on the line 5—5 on Fig. 1. Fig. 6, is a similar view on the line 6—6 on Fig. 1. Fig. 7, is a detail view of one of the steel sides and one set of endless slatted conveyers, the shafts that support the conveyers, the ratchet lever and disk devices and the connections that join the said devices and the hold back dogs.

In the drawings, I have shown my improvements as applied to the ordinary type of horse press, but I desire it understood that under immaterial modifications, within the scope of the appended claims, the same may be readily applied to the usual type of "steamer" presses.

The press box 1 has the usual feed hopper and opening 2 in the top, under which operate the beater or plunger 3, also of the usual form and actuated by any well known means which need not be here specifically referred to.

4 designates dogs that receive the hay from the beater or plunger also arranged as ordinarily. My improvements are applied on the press and begin just where the dogs 4 receive the hay from the plunger or beater and generally comprises a pair of oppositely disposed steel sides 5—5, in practice, eighteen to twenty inches long, which abut the top and bottom extensions 6—6ª of the press and are held from lateral expansion by the tension posts or bars 7—7 joined at the top and bottom by the cross or tension bolts 8—8 as shown. Since the construction of the two steel sides, the endless conveyers and actuating mechanisms for each side are alike a detailed description of one set of sides and coacting devices will suffice for both. The side 5 has a series of horizontal flanges 5ª, three being shown, an upper, a lower, and a central set, on each of which is journaled a series of horizontal friction rollers 9—9, the purpose of which will presently appear.

10 designates a shaft located at the end of the steel side and journaled in the brackets 11 and 12 located on the top and bottom 6—6ª and which carries polygonal shaped pulleys 13—13 in line with the steel side member and at its lower end it has a ratchet wheel 14 with which coöperates the ratchet lever 15 presently again referred to.

15ª designates a shaft located in advance of the steel side, journaled in the brackets 16—16ª and which has a series of pulleys 13ª shaped similar to pulleys 13 around which and the pulleys 13 takes the endless flexible conveyer belt 17, consisting of a series of sprockets links 18 adapted to engage with the sprocket teeth 18ª on the pulleys 13—13ª, and which are joined by a canvas body 19 to which is connected a series of vertical slats 20—20 tapered in horizontal section, whereby to provide positive gripping edges 20ª for engaging the sides of the bale, it being understood that friction of that part of the slatted belt that passes over the inner face of the steel side is reduced by the belt engaging the rollers thereon, as clearly shown in Figs. 2 and 3.

The lever 15 is loosely connected to the lower end of shaft 10, and has a pawl 15ᵇ to engage the ratchet 16ª whereby when swung inwardly in the direction indicated by arrow a on Fig. 2 it will impart a partial rotation to the said shaft 10 and thereby cause the slatted belt to move forward, and by reason of the frictional contact with the bale, move the bale along a distance proportionate to the swing of the said lever 15, to which motion is imparted by a coupling rod 21 that has a flexible connection 21ª that passes over a guide pulley 22 and has its end 23 made fast to the plunger or beater head, the connection in the drawing being such that the lever 15 is actuated to turn the shaft 10 on the forward thrust of the beater, but the same result can be obtained from the back thrust of the beater by connecting the rod 21 to the beater in the required manner.

By reason of the peculiar construction and arrangement of the parts described, it is manifest that under each thrust of the beater or plunger, the slatted belt will move the material along to the ejecting or tying point and since the tension of the steel sides can be regulated as described, the slatted belt will grip the bale tight enough to push same through back tension, thus helping the beater doing its work, the ratchet lever action drawing the belts from zero to six inches more or less, according to the stroke of plunger or beater, or what the feeder puts into the press.

My improvements provide for gaining power and as the lever is drawn by the beater, the press gets all the power it normally has besides actuating my improved means for moving the bale along.

To provide for holding the bale from springing back without cutting the hay as is usually done with the ordinary types of hold back dogs, the lever 15 is connected by the link member 26 with the crank arm 28 of a rock shaft 25 mounted on the press, as best shown in Fig. 7. The shaft 25 has a dog 29 that extends into the press chamber and presses on the hay when the bales fail to fill the said chamber.

Having thus described my invention, what I claim and desire to secure by Letters Patent, is:—

1. In a baling press, a baling chamber having guide rolls on its inner sides, endless belts traveling over the rollers, shafts for the belts, ratchet and pawl devices for actuating the shafts, the beater or plunger, and a connection between the plunger and ratchet and pawl devices for actuating said latter devices when the beater is thrust forward.

2. The combination with the beater, the steel sides, the tension devices for said sides, the sprocket carrying shafts, the sprocket chains, the slat carrying webs mounted on said chains, a hold back detent and means controlled by the movement of the beater for actuating the said detent and the slatted web carrying rollers at predetermined times, as described.

3. In a baling press of the character described, the combination with the baling box having a feed throat midway its ends, the hold back dogs located beyond the feed throat, and the plunger operable across the feed throat and the hold back dogs, of movable sides that form a part of the baling box, said sides consisting of endless flat belts, guide and drive shafts and pulleys for the said belts, the belts being located in advance of the hold back dogs, one set of shafts having ratchets, levers loosely mounted on the ratchet carrying shaft, pawls on the levers for engaging the ratchets, automatic means for moving the levers in one direction, and means connecting the levers with the plunger whereby to move said levers in the other direction under the thrust movement of the plunger, as set forth.

MYRON IRVING WILSON.

Witnesses:
 WM. HALLEMAN,
 GEO. DETMERF.